United States Patent [19]

Scadding

[11] Patent Number: 4,706,615
[45] Date of Patent: Nov. 17, 1987

[54] ENGINE COOLING SYSTEM

[75] Inventor: John R. Scadding, Chelmsford, United Kingdom

[73] Assignee: Ford Motor Company, Dearborn, Mich.

[21] Appl. No.: 881,538

[22] Filed: Jul. 2, 1986

[51] Int. Cl.⁴ ................................................. F01P 5/06
[52] U.S. Cl. ............................ 123/41.01; 123/41.49; 123/198 E
[58] Field of Search ............... 123/41.04, 41.05, 41.06, 123/41.44, 41.49, 198 E, 41.01

[56] References Cited

U.S. PATENT DOCUMENTS

| | | | |
|---|---|---|---|
| 2,523,404 | 9/1950 | Wallace | 123/41.04 |
| 4,203,407 | 5/1980 | Fachbach et al. | 123/198 E |
| 4,409,933 | 10/1983 | Inone | 123/41.49 |
| 4,455,971 | 6/1984 | Kirchweger et al. | 123/198 E |
| 4,457,558 | 7/1984 | Ishikawa | 123/41.05 |
| 4,590,889 | 5/1986 | H'Ereth | 123/41.05 |

FOREIGN PATENT DOCUMENTS

| | | |
|---|---|---|
| 831597 | 3/1956 | United Kingdom . |
| 1017885 | 11/1964 | United Kingdom . |
| 1282136 | 11/1969 | United Kingdom . |
| 1488257 | 2/1974 | United Kingdom . |
| A211772 | 11/1982 | United Kingdom . |

Primary Examiner—William A. Cuchlinski, Jr.
Attorney, Agent, or Firm—Robert E. McCollum; Clifford L. Sadler

[57] ABSTRACT

The invention provides an engine cooling system for a water cooled engine in a motor vehicle, comprising a radiator 18 totally enclosed within ducting such that air flowing through the radiator does not otherwise pass through the engine compartment. The radiator 18 is arranged within a branched ducting with two outlet openings, one branch being fan 20 assisted and the other opening into a region 28 of low pressure at the front underside of the vehicle. An undershield 22 serves to enclose the engine and separate air flow paths are formed for cooling the oil sump, the top of the engine and the exhaust manifold.

3 Claims, 1 Drawing Figure

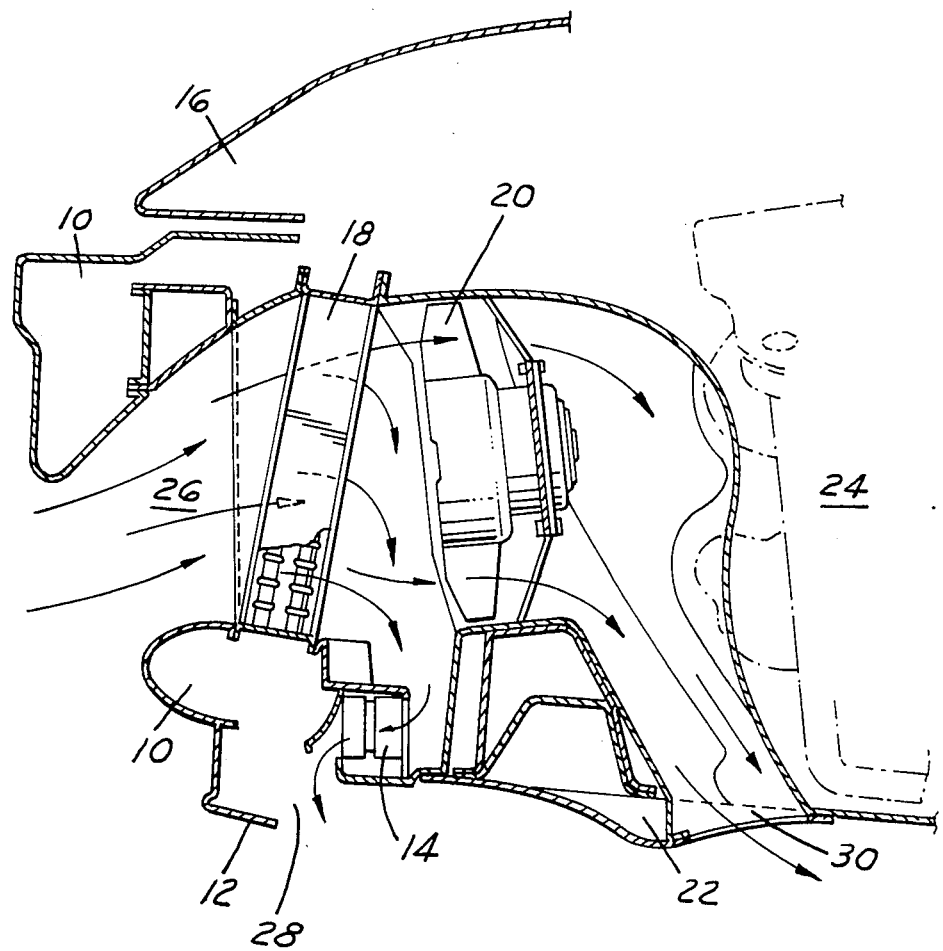

ENGINE COOLING SYSTEM

The present invention relates to an engine cooling system for the water cooled engine of a motor vehicle.

Various proposals have been made in the past to isolate the engine compartment from the cooling air flowing over the radiator. Examples of such proposals are to be found in GB-A-2 117 721 and GB Pat. Nos. 1 488 257 and 1 017 885. An advantage of this is that the engine compartment should be cooled by ambient air rather than air heated by the radiator. However, the known proposals do not provide adequate engine cooling under all operating conditions.

The present invention seeks to provide an engine cooling system which isolates the engine compartment from the air heated by the radiator yet which is effective under all operating conditions and makes effecient use of the aerodynamic properties of the vehicle to assist in forcing air through the radiator without creating unnecessary drag.

According to the present invention, there is provided a motor vehicle engine cooling system, comprising a radiator totally enclosed within ducting such that air flowing through the radiator does not otherwise pass through the engine compartment, and further passages for allowing ambient air to enter and leave the engine compartment, wherein the ducting of the radiator has a forward facing inlet upstream of the radiator which opens at the front of the vehicle, a first outlet facing forwards and disposed adjacent a speed spoiler at the front of the vehicle and connected to the radiator by a branch of the ducting containing a non-return valve and a second outlet disposed on the underside of the vehicle and connected to the radiator by a branch of the ducting containing a power driven fan.

The region of a vehicle immeditately behind a front speed spoiler is one of strong negative pressure when the vehicle is in motion. By opening the first ducting outlet in this region of the body, it is ensured that sufficient air flows through the radiator when the vehicle is in motion to avoid the need to operate the powered fan. The fan need only operate when the vehicle is travelling at low speed and during such operation the valve in the other branch of the ducting lying downstream of the radiator remains closed to avoid reverse flow and ensure that the blown air passes through the radiator.

The positive pressure inlet to the ducting is desirably located in the front bumper, the latter being shaped to provide a ram effect for forcing air into the duct.

Because of the difficulty in placing a fan of adequate power within a duct of acceptable size, in other words in order to comply with packaging constraints, it is preferred to employ two axial flow fans arranged downstream of the radiator, the fans conveniently being controllable separately.

Since the ducted air cannot serve to cool other parts of the engine such as the oil sump, the exhaust and the upper end of the engine, additional air intake slots are provided to introduce air into the engine compartment, the air exiting through a space between the engine undershield and the vehicle floor.

Preferably, further exit slots are provided at the top of the engine compartment. These ensure that cooling of the engine compartment continues by natural convection even when the engine is at a standstill. In this case, the direction of flow through the space between the vehicle floor and the engine undershield is reversed.

When the vehicle comes to a standstill after prolonged operation, though the engine is cooled by natural convection in the manner described above, it is desirable also to cool the water. This may be achieved by providing an electrically powered water pump and continuing to drive the pump and the radiator fan either for a predetermined time after the engine is switched off or preferable in response to an excessive rise of water temperature.

The invention will now be described further, by way of example, with reference to the accompanying drawing which is a schematic diagram of an engine cooling system of the invention.

In the drawing, there is shown schematically the cooling system of a motor vehicle. The cooling system comprises a radiator 18 through which there circulates in the usual manner the engine cooling water. The radiator is fully contained within ducting which comprises an intake duct 26 located upstream of the radiator 18 and a branched outlet duct leading to two openings which are designated 28 and 30, respectively.

The air intake duct is defined within the front bumper 10 of the motor vehicle, disposed below the bonnet 16. At its lower end, as is now common, the bumper 10 is formed with a speed spoiler lip 12 for improving the vehicle handling performance. The speed spoiler 12 acts to create a strong region of negative pressure when the vehicle is in motion and use is made of this fact by arranging one outlet 28 immediately behind the spoiler lip 12 and facing forwards. The negative pressure acts to force air through the radiator enhancing the ram effect of the intake duct 26 and ensures that at moderate speeds the radiator does not need to be fan cooled.

Two axial fans 20 (of which only one can be seen in the drawing) drive air through the branch of the outlet duct leading to the opening 30. When the vehicle is at a standstill and the engine is idling, the fan 20 tries to draw air in through the opening 28 instead of through the radiator 18. In order to prevent this, one way flap valves 14 are arranged in the second branch of the outlet duct to allow air to flow in only one direction through the outlet opening 28.

An undershield 22 is provided beneath the engine compartment so that the engine is virtually encapsulated and the undershield is shaped ahead of the opening 30 to provide a negative pressure at this opening too.

Because the air cooling the radiator cannot, as in a conventional design, cool other parts of the engine, special steps are taken to avoid overheating of the oil and the exhaust manifold. In the preferred embodiment, ram air intake slots (not shown) are located low in the front bumper region below each headlamp to cool the sump and the bottom of the engine compartment. To cool the top of the engine compartment, still further slots are arranged centrally between the two headlamps. The heated air is vented between the rear of the undershield 22 and the floor of the vehicle after passing over the engine 24.

The air also escapes through vents, not shown, at the top of the engine compartment, for example over the upper ends of wheel arches. This venting at the top of the engine compartment acts to assist in cooling the engine when it is stopped after a long run for now a flow path is established which allows air to be drawn from the underside of the vehicle to cool the engine and then to escape through the openings at the top of the engine compartment. In this case, air is flow is reversed in the outlet at the rear of the undershield.

In order to cool the exhaust manifold, a separate insulating aluminium foil/fibre wool sandwich duct is provided. The air flow in this latter duct may for most operating conditions be assured by dynamic pressure flow but a fan may be provided for idle and soak conditions. A small centrifugal fan is preferred for this task. It is possibly desirable, however, to take advantage of a hotter exhaust system with its potential benefits to catalyst light-up performance.

It is further desirable to provide an electrically cooled water pump so that if necessary the engine water can be cooled even after the engine has been stopped by operation of the water pump and the cooling fan. This is preferably effected automatically if the engine water temperature rises above a predetermined value though alternatively the pump and the fan may always remain actuated by a delayed switch which allows the excess heat to dissipated each time the engine is stopped, in order to avoid the water boiling over.

In addition to achieving virtual engine encapsulation, it is believed that with the aid of the invention, it is possible to improve the drag coefficient of a car by reducing the drag caused by the cooling system, without adversely the cooling performance of the car.

I claim:

1. A motor vehicle engine cooling system, comprising a radiator (18) totally enclosed within ducting such that air flowing through the radiator (18) does not otherwise pass through the engine (24) compartment, and further passages for allowing ambient air to enter and leave the engine compartment, characterised in that the ducting of the radiator (18) has a forward facing inlet (26) upstream of the radiator (18) which opens at the front of the vehicle, a first outlet (28) facing forwards and disposed adjacent a speed spoiler (12) at the front of the vehicle and connected to the radiator by a branch of the ducting containing a non-return valve (14) and a second outlet (30) disposed on the underside of the vehicle and connected to the radiator (18) by a branch of the ducting containing a power driven fan (20).

2. A motor vehicle cooling system as claimed in claim 1, wherein the positive pressure inlet to the duct is located in the front bumper (10), the latter being shaped to provide a ram effect for forcing air into the duct (26).

3. A motor vehicle cooling system as claimed in claim 1 or 2, wherein two axial flow fans (20) are arranged laterally side by side downstream of the radiator (18).

* * * * *